(12) United States Patent
Castillo et al.

(10) Patent No.: US 7,334,759 B2
(45) Date of Patent: Feb. 26, 2008

(54) AIRPLANE SURFACE PROTECTION FILM KITS

(76) Inventors: Francisco J. Castillo, 938 Calle Primavera, San Dimas, CA (US) 91773; Jeanne M. Castillo, 938 Calle Primavera, San Dimas, CA (US) 91773

( * ) Notice: Subject to any disclaimer, the term of this patent is extended or adjusted under 35 U.S.C. 154(b) by 59 days.

(21) Appl. No.: 11/016,309

(22) Filed: Dec. 18, 2004

(65) Prior Publication Data
US 2006/0145008 A1  Jul. 6, 2006

(51) Int. Cl.
*B64C 7/00*  (2006.01)
(52) U.S. Cl. .................. 244/121; 244/129.1
(58) Field of Classification Search ............ 244/1 R, 244/121, 129.1, 123.1, 200
See application file for complete search history.

(56) References Cited

U.S. PATENT DOCUMENTS

| | | | |
|---|---|---|---|
| 5,556,491 A * | 9/1996 | Servanty et al. ............ 156/64 |
| 5,848,769 A * | 12/1998 | Fronek et al. ............ 244/200 |
| 6,080,833 A | 6/2000 | Otsuji et al. | |
| 6,177,189 B1 * | 1/2001 | Rawlings et al. ............ 428/343 |
| 6,291,021 B1 | 9/2001 | Morita et al. | |
| 6,341,747 B1 * | 1/2002 | Schmidt et al. .......... 244/123.1 |
| 6,475,610 B1 | 11/2002 | Keener et al. | |
| 6,503,567 B2 | 1/2003 | Ogawa et al. | |
| 6,610,394 B2 | 8/2003 | Keener et al. | |
| 2003/0104170 A1 | 6/2003 | Johnston et al. | |

OTHER PUBLICATIONS http://www.spalshield.com/services.*
http://www.lockheedmartin.com/news/press_releases/1997/LockheedMartin3MPaintlessAircraftWo.html.*

* cited by examiner

*Primary Examiner*—Timothy D. Collins
(74) *Attorney, Agent, or Firm*—Law Offices of Michael N. Cohen, PC; Michael N. Cohen (57) ABSTRACT

Described herein is a computer design-aided shield for exposed surfaces on aircraft, a method for manufacture, and kits derived from collections of shields, each kit appropriate for use on a single aircraft type. The shield is contemplated for first use on general and corporate aviation aircraft. The kits are designed for convenient distribution to private pilots, and easy use by them on their aircraft. The shields can be transparent, or can bear lettering or insignia.

12 Claims, 7 Drawing Sheets

AIRPLANE SURFACE PROTECTION FILM KITS

BACKGROUND OF THE INVENTION

Field of the Invention

The present invention relates generally to the field of general and corporate aviation. The present invention relates most particularly to covering and shielding materials for exposed surfaces and leading edges of light aircraft. Such shielding materials are typically films that are applied to protect the aircraft from the elements inherent in the environment.

The present invention further relates to computer-designed shield elements, designed to fit specific exposed areas on the surface of aircraft. The invention also relates to kits, comprised of collections of the shields designed to fit an individual aircraft type.

The invention further relates to a method for making such kits as specific for individual aircraft, thus resulting in a novel and unusual method for convenient marketing and distribution of the shields.

DESCRIPTION OF THE RELATED ART

Nowhere in the prior art is described a similar method for the production of protective film kits, whether limited to general and corporate aviation, or other aircraft designs. A survey of the prior art has revealed the following publications relevant to aspects of the current invention.

U.S. Pat. No. 6,291,021 issued on Sep. 18, 2001 to inventors Morita et al, assigned to a Dow Corning company. The invention described is a film based on a polymer with carbosiloxane dendrimer functionality. It acts to repel water and resist weathering.

U.S. Pat. No. 6,503,567 issued on Jan. 7, 2003 to inventors Ogawa et al. This patent reveals a transparent fluorosilicate-based coating for windows, reading glasses, and the like. A different composition with similar properties was described by Otsuji, et al, in U.S. Pat. No. 6,080,833, which issued on Jun. 27, 2000.

U.S. 20030104170, a patent application that was published on Jun. 5, 2003 to inventors Johnston et al describes a surface film assembly for liquid acquisition and transport.

Another type of surface film assembly is described in two U.S. patents issued to one set of inventors. U.S. Pat. No. 6,610,394 issued to inventors Keener et al on Aug. 26, 2003, following an earlier patent, U.S. Pat. No. 6,475,610, which issued to the same inventors on Nov. 5, 2002. In this invention, aluminum metal surfaces are coated for protection.

It will readily be seen that none of these prior art inventions in any way describes or makes known the instant invention herein presented.

SUMMARY OF THE INVENTION

The present invention relates generally to shields comprised of pre-cut form-fitting polymer film shields for fitting onto leading exposed surfaces of aircraft, and kits formed from the aggregation of said shields, each kit corresponding to parts for a single aircraft type.

The shields are constructed in a unique manner from flat sheets of polymeric film, and are cut to form fitted shields which fit directly over the surfaces to be protected. The film has an adhesive-holding surface, and a peelable film to protect the adhesive from the environment prior to use.

It is an object of the present invention to provide shields for exposed surfaces of aircraft, especially for general and corporate aviation aircraft.

It is a further object of the present invention to provide an efficient method for producing the shields for exposed surfaces of aircraft, especially for general and corporate aviation aircraft.

Another object of the current invention is to provide protection for exposed surfaces of aircraft against the elements of sunshine, wind, rain, sand, and other hazards to which the aircraft is exposed, whether in flight or parked on a tarmac.

Further objects and advantages of the present invention will become apparent from the following descriptions, taken in connection with the accompanying drawings, wherein, by way of illustration and example, several embodiments of the present invention are disclosed.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

FIG. 1 (*a*) is a view from directly above of a light airplane with protective shields in place, and FIG. 1 (*b*) is a frontal view thereupon. The shields are transparent and therefore not seen, but are indicated by numerals.

DETAILED DESCRIPTION OF THE INVENTION

Detailed descriptions of the preferred embodiment are provided herein. It is to be understood, however, that the present invention may be embodied in various forms. Therefore, specific details disclosed herein are not to be interpreted as limiting, but rather as a basis for the claims and as representative basis for teaching one skilled in the art to employ the present invention in virtually any appropriately detailed system, structure or manner.

The present invention relates generally to shields comprised of pre-cut form-fitting polymer film elements for fitting onto leading exposed surfaces of aircraft, and method for manufacturing same. The present invention also contemplates kits formed from the aggregation of said shields, each kit corresponding to parts for a single aircraft type.

The shields are constructed in a unique manner from flat sheets of polymeric film, and are cut to form fitted shields which fit directly over the surfaces to be protected. The film has an adhesive-holding surface, and a removable film to protect the adhesive from the environment prior to use.

3M® 8674 is one example of a preferred polymeric film to be used in the present invention.

In the present invention, shield forms are computer-generated to form-fit the designated exposed aircraft surfaces. Shields are cut from the sheets of polymer to correspond to these forms, which are generated to designate the nose wheel shields, side step shields, the main landing gear pods, landing gear shields, and other exposed surfaces of a particular aircraft.

These shields are gathered together and sold as sets, or kits, with each kit containing the forms for a particular model of aircraft. Instructions for usage are included in each kit.

The purchaser of the kit, typically a private pilot or member of a ground crew, need only peel off the backing film from a shield form, and following instructions, apply the shield to the corresponding surface of the aircraft. The shield remains in place, protecting the surface from possible damage due to elements within the environment.

Figure 1:
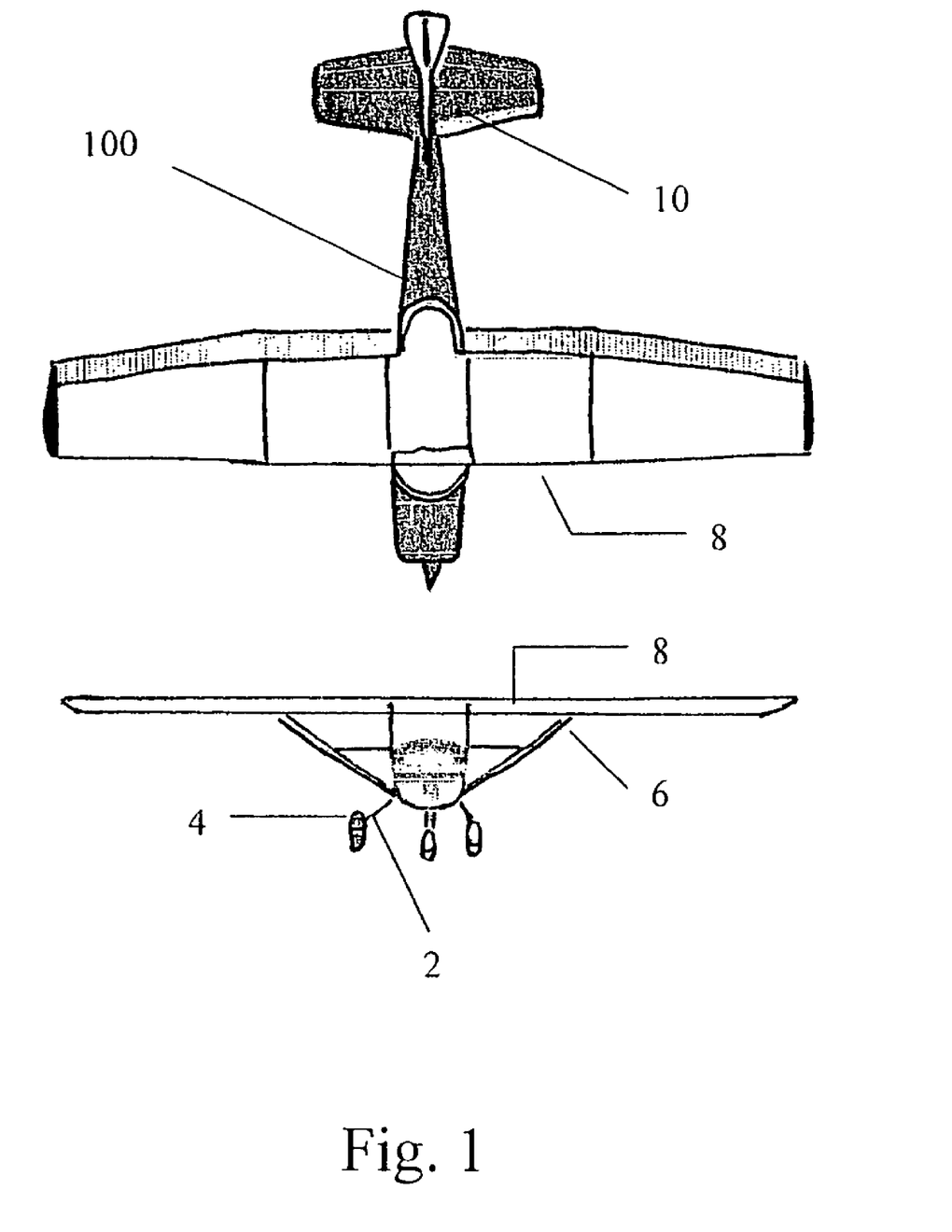

FIG. 1 shows a typical aircraft of the type found in general and corporate aviation. The owner and operator of such aircraft is typically an individual private pilot, or small business operator of a flying service. Often, these small operators do not have the means available to larger aircraft operators (such as commercial airlines, or the military) to care for and protect their aircraft.

The present invention offers a means for corporate, small business, and individual private pilots to extend the life of their aircraft by purchasing low-cost kits of shields, specifically designed for various exposed surfaces for their type of aircraft. The individuals apply their own shields, much in the way that one applies a decal to an aircraft. The shields are typically transparent, and do not at all detract from the appearance of the aircraft. They are designed to protect the aircraft from the effects of weather, insects, sand, and other hazards encountered by aircraft, both when flying and when parked on the tarmac.

FIG. 1 shows a typical light aircraft 100 with exposed surfaces identified. Leading edges of tail 10 and of wings 8, seen in FIG. 1 (*a*), are all examples of exposed surfaces that are protectable by using the shields of the instant invention. FIG. 1 (*b*) illustrates the same aircraft from a frontal view with exposed surfaces identified as: landing gear struts 2, wing struts 6, and landing gear covers 4, also protectable by using the shields of the instant invention. Note that the aircraft itself is not part of the current invention.

In a preferred embodiment of the current invention, the shields are approximately 0.36 mm (0.008 inch) in thickness. These dimensions include both protective film element and adhesive layer. The protective film is preferably about 3 times as thick as the adhesive layer.

The film elements comprising the shield are typically transparent. However, they may also be of solid appearance, and indeed may bear lettering, artwork, or other insignia. This could be useful advertising for the aircraft manufacturer, the manufacturer of the shields of the instant invention, or other purveyors of service or goods to the general and corporate aviation community.

The remaining figures will demonstrate the application of the current invention by revealing forms designed for specific aircraft types. It will be understood that the techniques described herein are not limited to the specific aircraft types illustrated. Indeed, a valuable asset of the current invention is that it is adaptable to virtually any type of aircraft, including types outside of those industry classes in which the illustrated aircraft are placed. Thus, commercial airlines, or even military aircraft, could benefit from application of the current invention.

Figure 2:
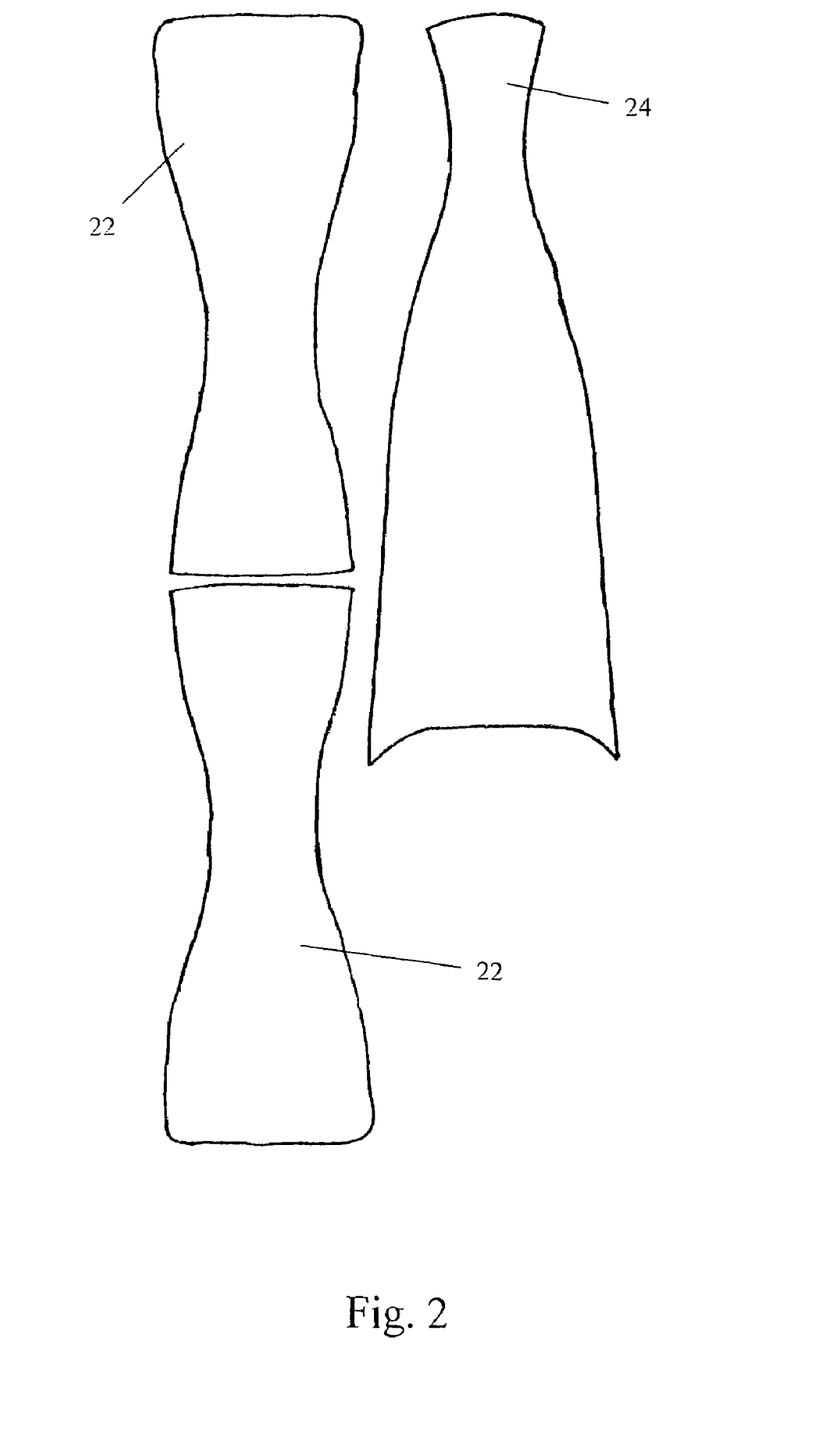
FIG. 2 is a view of the parts included in a kit for a Piper Cherokee aircraft, including shields for the exposed surfaces of the landing gear.

FIG. 2 displays a typical group of computer-generated forms for producing shields for a Piper Cherokee aircraft. The corresponding airplane kit includes shields for the protection of the main landing gear 22, and the nose wheel cover 24.

Figure 3:
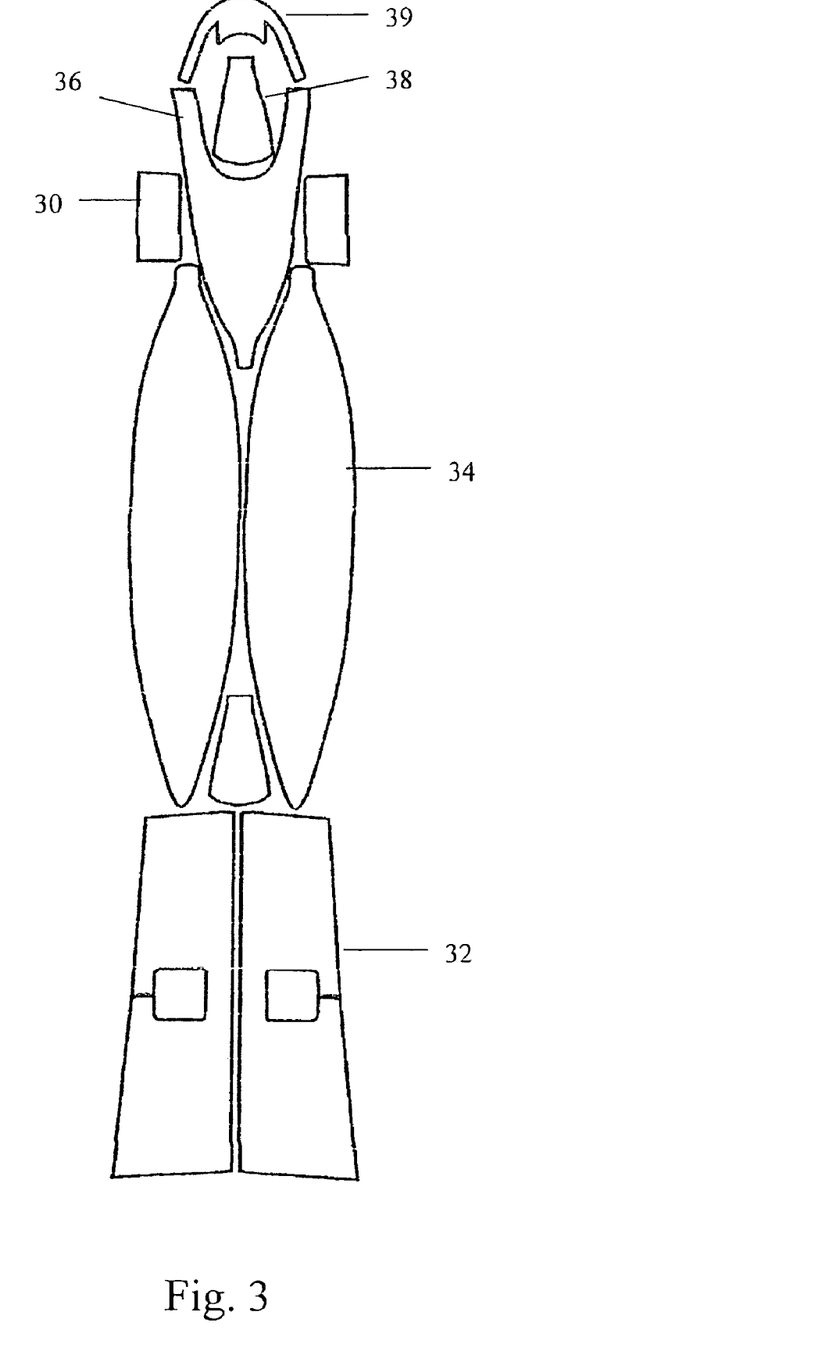
FIG. 3 is a view of the parts included in a kit for a Cessna 172 aircraft, including shields for the exposed surfaces of the landing gear and side steps.

FIG. 3 shows a typical group of computer-generated forms for producing shields for a Cessna 172 aircraft. The corresponding airplane kit includes shields for the protection of the main gear 34, the landing gear 32, the lower and upper nose wheel 38 and 39, respectively, and the nose wheel fairing 36. Also included are shields for exposed steps 30 on each side of the fuselage.

Figure 4:
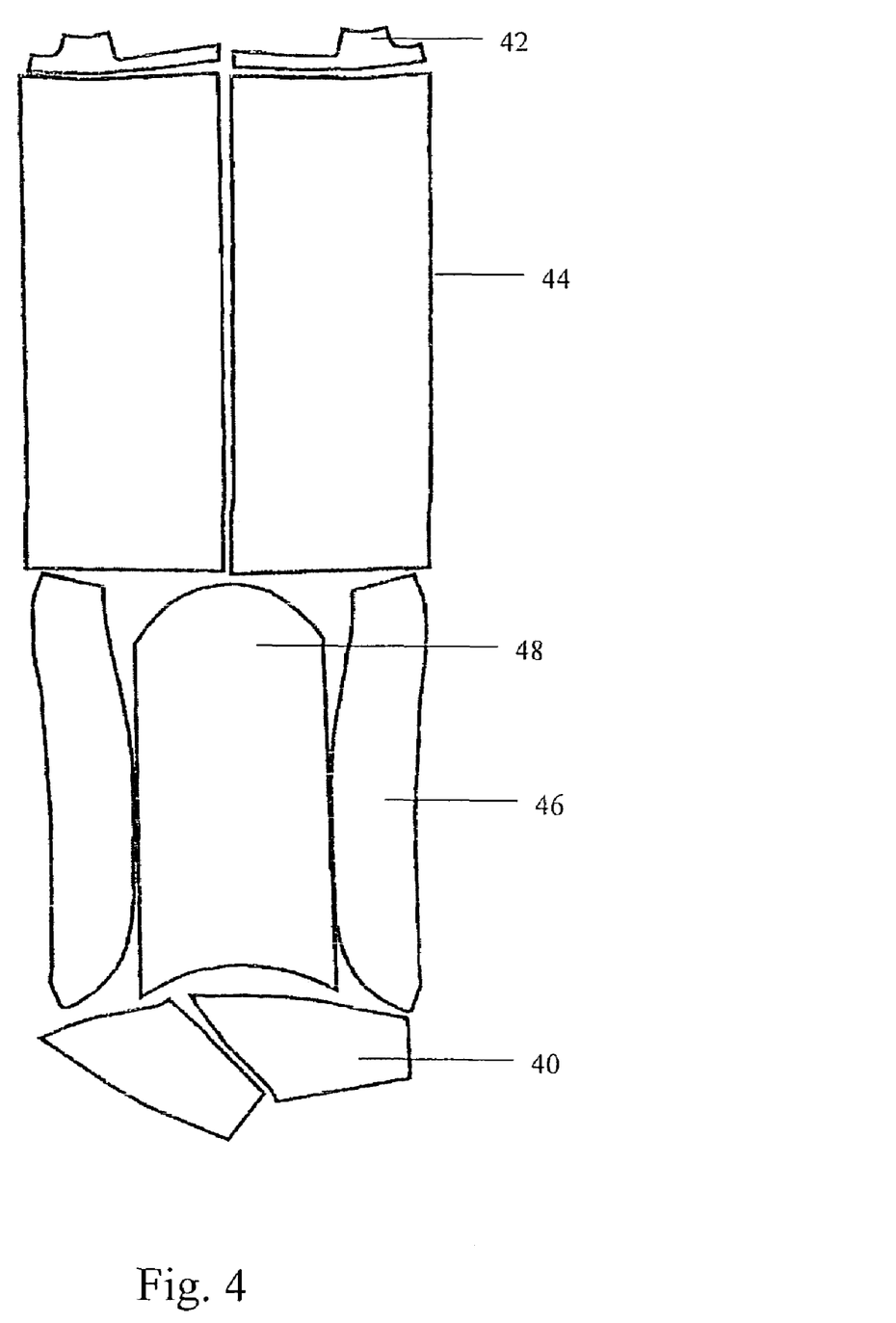
FIG. 4 is a view of the parts included in a kit for a Cessna 208 aircraft, including shields for the exposed surfaces of the landing gear and wing struts.

FIG. 4 shows a typical group of computer-generated forms for producing shields for a Cessna 208 aircraft. The corresponding airplane kit includes shields for the protection of the main gear 44, the upper part of main gear 42, the nose wheel strut 48, and the landing gear fairing 46. Also included are shields for the wing struts 40 on each side of the fuselage underneath each wing.

Figure 5:
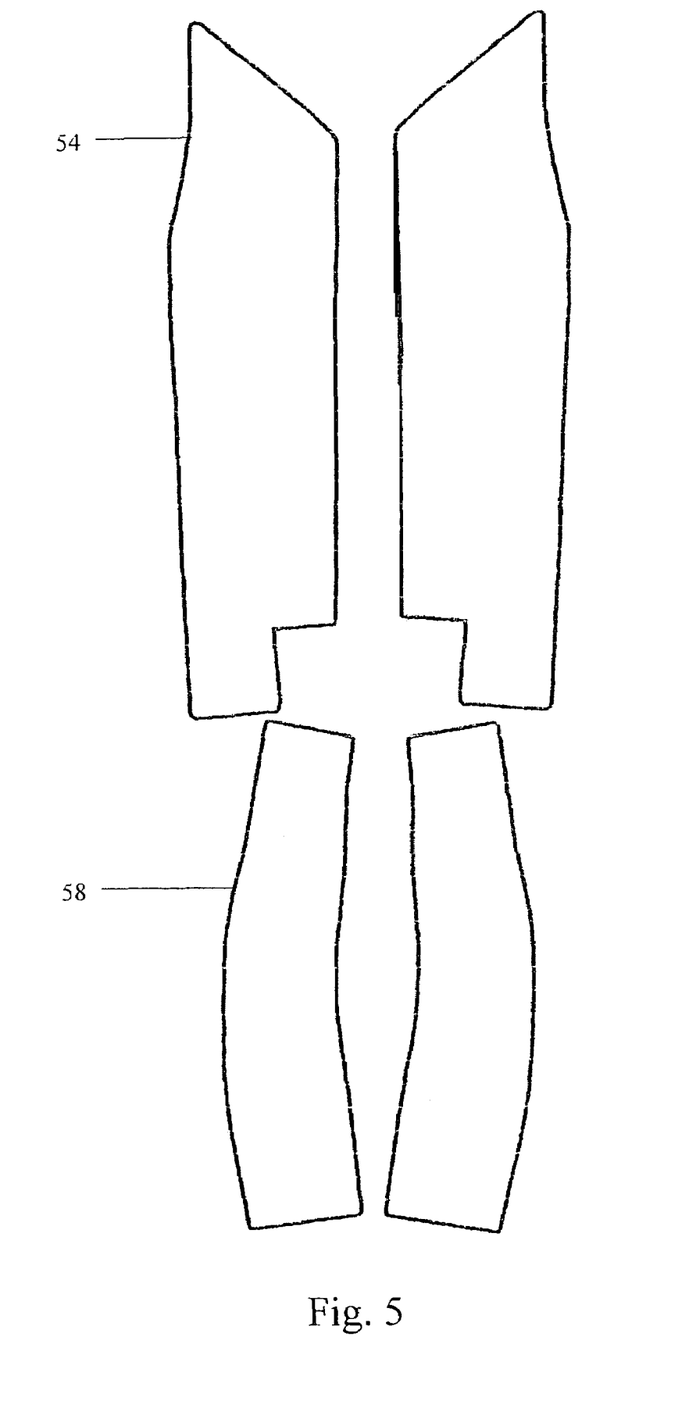
FIG. 5 is a view of the parts included in a kit for a Cessna 210 aircraft, including shields for the exposed surfaces of the upper and lower landing gear.

FIG. 5 shows a typical group of computer-generated forms for producing shields for a Cessna 210 aircraft. The corresponding airplane kit includes shields for the protection of the upper main gear 54, and the lower main gear 58.

Figure 6:
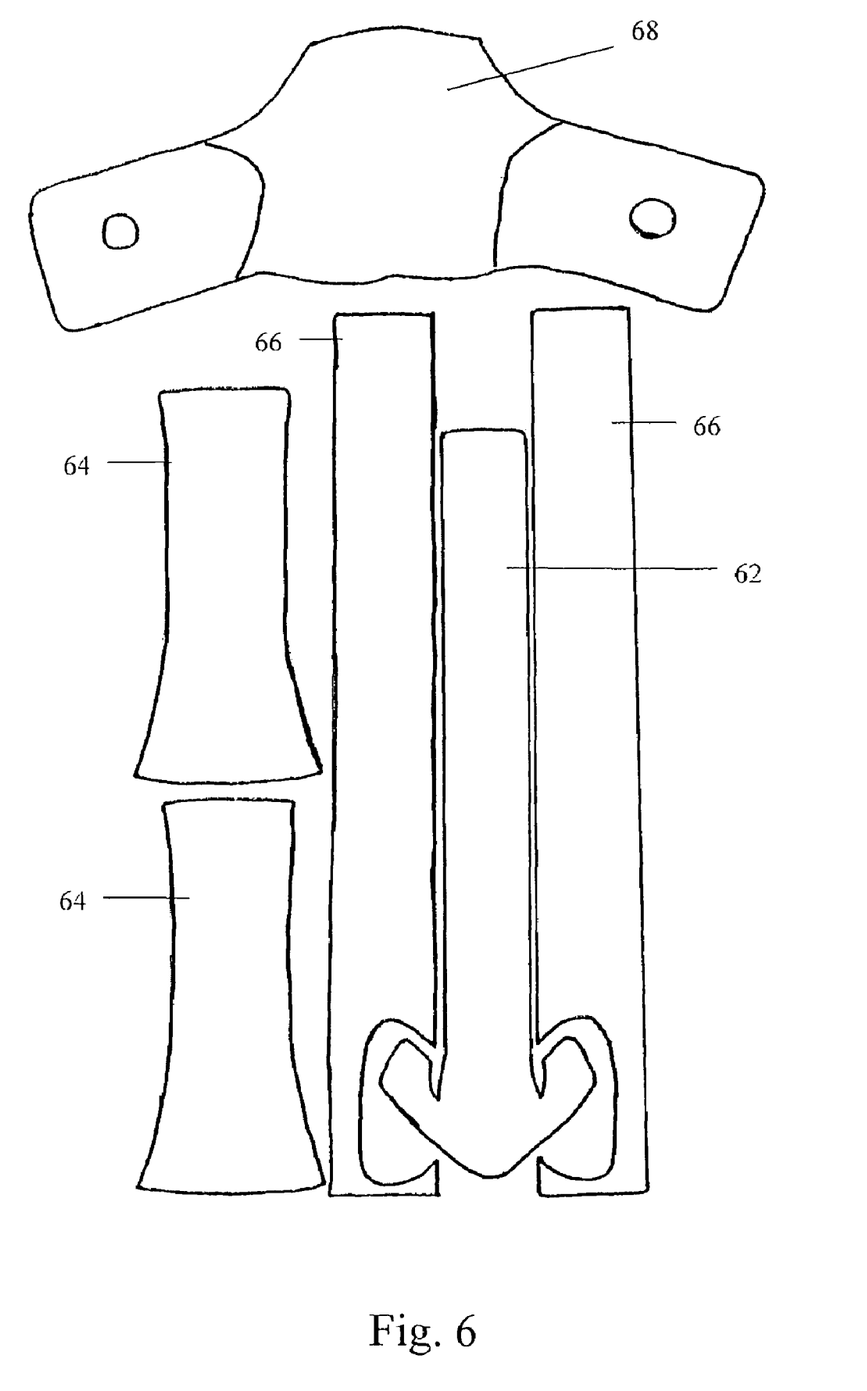
FIG. 6 is a view of the parts included in a kit for a Cirrus SR20 or SR22 aircraft, including shields for the exposed surfaces of the nose wheel and main landing gear.

FIG. 6 indicates a typical group of computer-generated forms for producing shields for a Cirrus SR20 aircraft. The same forms are used for the Cirrus SR22 aircraft. The corresponding airplane kit includes shields for the protection of the main gear 64, the nose wheel strut 62, and the landing gear fairing 66. Also included are shields for the nose wheel 68.

Figure 7:
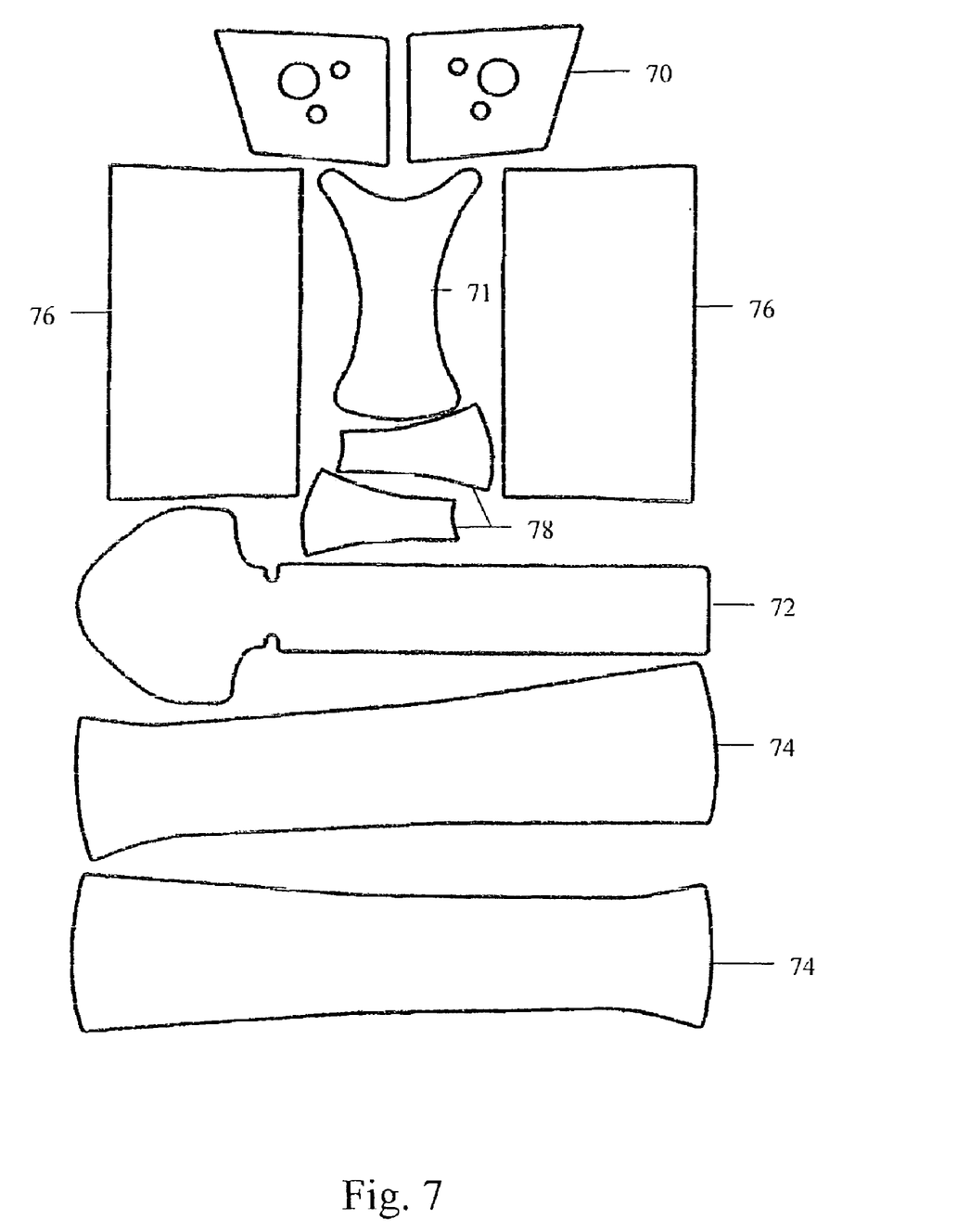
FIG. 7 is a view of the parts included in a kit for a Cirrus aircraft, including shields for the exposed surfaces of the upper and lower landing gear.

FIG. 7 shows the kit corresponding to the SR22 GTS aircraft produced under the Cirrus label. The various parts labeled 70, 71, 72, 74, 76, and 78 correspond to shields fitting nose wheel side guards 70, nose wheel back fairing 71, nose wheel front fairing 72, lower main gear 74, main gear struts 76, and upper landing gear struts 78.

The best of computer programs at the present time are not sufficiently advanced in the field so as to generate perfect forms for the shields of the current invention, in one pass. Typically, the process for developing forms is an iterative process. The initial form, a rough approximation to the desired shape, is generated either by hand-drawing from the aircraft itself, by computer-aided drawing, or by scanning of the aircraft section desired to be shielded. The form is then enhanced by computer illustration techniques to a closer approximation of the final shape, then hand-fitted to the aircraft. Final changes are noted and added to the computer image, resulting in a finished form for a shield. This exacting process often requires two or three, or more, iterations from rough form to final finished form.

The computer illustration techniques can be CAD program based, or commercially available illustrator software. In one embodiment, the commercial programs of Photostop and Illustrator, both from Adobe Systems Incorporated, are used for enhancement of the forms.

Once the final forms are complete, they are archived, and can then be used to generate any number of shield elements for the particular aircraft and surface for which the form was designed.

This is an exacting process because the shield elements must fit closely to their designed surface area. This often involves curves or even corners. Excess material created by a poorly fitting shield will quickly abrade during use, and can compromise the entire shield, rendering it useless for its designated duty of protection of the underlying airframe from damage.

It is notable that not all exposed surfaces of the aircraft present equally difficult modeling challenges for the shield manufacturer. Leading edges, such as are found on the front edges of wings and tail, require no more artistry than cutting a length of polymeric film of appropriate dimension. Thus, the kits of the present invention often do not contain shields for leading edges. These are sold separately.

Occasionally, a customer will purchase a number of only one type of shield, rather than a complete kit. More commonly, though, the pilot will purchase an entire kit, perhaps with additional leading-edge film, for complete coverage and protection of the exposed and sensitive surfaces of his or her aircraft.

While the invention has been described in connection with a preferred embodiment or embodiments, it is not intended to limit the scope of the invention to the particular form set forth, but on the contrary, it is intended to cover such alternatives, modifications, and equivalents as may be included within the spirit and scope of the invention as defined by the appended claims.

We claim:

1. A protective shield for the exposed surfaces of aircraft, comprising:
   a film element, form-fitted to correspond to a designated area of the surface of an aircraft, said area comprising an exposed surface of said aircraft;
   said film element being fixedly attachable to said designated area by attachment means on the back of said film element is comprised of a weather-resistant polymeric material that is at least 1 mm thick, capable of withstanding external forces experienced by aircraft during flight and is pre-cut using computer generated forms to ensure close fitting to said designated area of the surface of an aircraft.

2. The shield of claim 1, wherein said film element is transparent.

3. The shield of claim 1, wherein said film element comprises surface lettering or other surface design.

4. The shield of claim 1, wherein said attachment means are comprised of film adhesive.

5. The shield of claim 1, wherein said designated areas, include exposed areas on the Landing gear struts of said aircraft.

6. The shield of claim 1, wherein said designated areas include exposed areas on or attached to the wing of said aircraft.

7. The shield of claim 1, wherein said designated areas include exposed areas on or attached to the tail of said aircraft.

8. The shield of claim 1, wherein the designated areas include exposed areas on or attached to the fuselage of said aircraft.

9. A method for the production of protective shields of claim 1, comprising;
   Operation of a computerized program to generate forms to closely fit the parameters of designated areas of the exposed surface of an aircraft;
   iterating said operation as necessary to refine forms;
   cutting a polymeric film sheet pre-coated with adhesive backing to form shields corresponding to said forms, wherein said polymeric sheets comprise weather-resistant and element-resistant material.

10. The method of claim 9, wherein all said shields in any one kit are cut to fit surfaces of one specific aircraft type.

11. A kit for assembly and distribution of the protective shields of claim 1, comprising:
   a plurality of pre-cut film elements, cut from polymeric sheets, said film elements being form-fitted to designated areas of the surface of an aircraft,
   wherein said polymeric sheets comprise weather-resistant and element-resistant material; said film clement being fixedly attachable to said designated areas by attachment means on the back of each said shield.

12. The kit of claim 11, wherein all said shields in any one kit are cut to fit surfaces of one specific aircraft type.

* * * * *